US010424341B2

(12) United States Patent
Thornton et al.

(10) Patent No.: US 10,424,341 B2
(45) Date of Patent: Sep. 24, 2019

(54) DYNAMIC VIDEO SUMMARIZATION

(71) Applicant: Massachusetts Institute of Technology, Cambridge, MA (US)

(72) Inventors: Jason R. Thornton, Chelmsford, MA (US); Christine M. Russ, Stoneham, MA (US); Nicholas Gallo, Irvine, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/539,672

(22) Filed: Nov. 12, 2014

(65) Prior Publication Data

US 2016/0133297 A1    May 12, 2016

(51) Int. Cl.
| | |
|---|---|
| *G11B 27/06* | (2006.01) |
| *H04N 21/44* | (2011.01) |
| *H04N 21/8549* | (2011.01) |
| *G11B 27/30* | (2006.01) |
| *H04N 7/18* | (2006.01) |
| *G06F 3/0484* | (2013.01) |
| *H04N 21/472* | (2011.01) |
| *G08B 13/196* | (2006.01) |

(52) U.S. Cl.
CPC .......... *G11B 27/06* (2013.01); *G06F 3/04845* (2013.01); *G06F 3/04847* (2013.01); *G08B 13/19682* (2013.01); *G11B 27/3081* (2013.01); *H04N 7/18* (2013.01); *H04N 7/181* (2013.01); *H04N 21/44008* (2013.01); *H04N 21/47217* (2013.01); *H04N 21/8549* (2013.01); *G08B 13/19602* (2013.01)

(58) Field of Classification Search
None
See application file for complete search history.

(56) References Cited

U.S. PATENT DOCUMENTS

| | | | |
|---|---|---|---|
| 6,625,310 B2 | 9/2003 | Lipton et al. | |
| 6,954,498 B1 | 10/2005 | Lipton | |
| 7,203,620 B2 | 4/2007 | Li | |
| 7,852,370 B2 | 12/2010 | Peleg et al. | |
| 8,102,406 B2 | 1/2012 | Peleg et al. | |
| 8,311,277 B2 | 11/2012 | Peleg et al. | |
| 8,457,401 B2 | 6/2013 | Lipton et al. | |
| 8,649,573 B1 * | 2/2014 | Darbari | G06K 9/00751 382/118 |

(Continued)

*Primary Examiner* — Hung Q Dang
(74) *Attorney, Agent, or Firm* — McCarter & English, LLP; David R. Burns

(57) ABSTRACT

Cyclical pixel-based remapping techniques are disclosed for efficiently creating and displaying a video summary. Cyclical temporal remapping at the pixel level requires less processing power and eliminates the need for object identification and tracking, allowing for dynamic adjustment of summary video parameters while a user is viewing the summary video. An operator can select an archived camera feeds or video file, specify a time compression ratio or time interval over which to review video content, specify a motion sensitivity threshold, and then view a significantly condensed summary video that depicts all activity from the source video within a much shorter timeline. Furthermore, activity co-occurrence is preserved such that any activities that co-occur in the source video will also co-occur in the summary video.

20 Claims, 7 Drawing Sheets

(56) References Cited

U.S. PATENT DOCUMENTS

| | | |
|---|---|---|
| 8,719,687 B2 | 5/2014 | Wu et al. |
| 2005/0185823 A1* | 8/2005 | Brown ............. G08B 13/19604 382/103 |
| 2007/0052803 A1 | 3/2007 | Chosak et al. |
| 2007/0273765 A1* | 11/2007 | Wang ................. G06K 9/00771 348/152 |
| 2008/0077953 A1 | 3/2008 | Fernandez et al. |
| 2008/0100704 A1 | 5/2008 | Venetianer et al. |
| 2010/0092037 A1* | 4/2010 | Peleg ................. G06F 17/3079 382/103 |
| 2010/0104261 A1* | 4/2010 | Liu ...................... G11B 27/034 386/241 |
| 2013/0121664 A1* | 5/2013 | Chung .................... H04N 5/91 386/241 |
| 2013/0163961 A1* | 6/2013 | Wu ........................ H04N 5/772 386/280 |
| 2014/0327680 A1* | 11/2014 | Hoppe .................... G06F 3/048 345/473 |

* cited by examiner

DYNAMIC VIDEO SUMMARIZATION

STATEMENT OF GOVERNMENT INTEREST

This invention was made with government support under Grant No. FA8721-05-C-0002 through the United States Air Force. The government has certain rights in this invention.

TECHNICAL FIELD

The present disclosure relates to techniques for video surveillance. More specifically, the present disclosure also relates to methodologies, systems and devices for creating a summary video for use in video surveillance.

BACKGROUND

Certain conventional video surveillance techniques, such as increasing the playback rate of a video file or creating a condensed version of a video, allow a user to compress the duration of a video file and increase surveillance efficiency. Video processing and video summarization techniques present a number of technical and computational challenges.

SUMMARY

Exemplary embodiments of the present disclosure provide systems, devices and methods for creating a summary video. The summary video is created using a cyclical, pixel-based remapping technique. In accordance with exemplary embodiments, a video editing method is disclosed for creating a summary video. The method includes generating a background image from a plurality of source video frames. The method also includes comparing the background image to one or more source video frames on a pixel by pixel basis to determine an activity level for pixels within the plurality of source video frames. The method also includes identifying active pixels within each of the plurality of source frames. An active pixel is identified as a pixel having an activity level greater than a motion sensitivity threshold value. The method also includes generating a plurality of summary frames by remapping active pixels from source frames, which are spaced within the source video by a multiple of the number of summary video frames, over spatially corresponding pixels in the background image. The method also includes generating a summary video by combining the plurality of summary frames into a summary video, the summary video having a number of summary frames less than a number of the source video frames.

In some embodiments, generating the background image includes determining, at periodic intervals within a source video, a median value for each pixel over a length of frames. In some embodiments, generating a plurality of summary frames includes remapping pixels such that activity that co-occurs in the source video also co-occurs in the summary video. In some embodiments, the number of frames in the summary video is determined based on a user configurable time compression ratio. In some embodiments, the motion sensitivity threshold value is user configurable. In some embodiments, the method also includes rendering, via an electronic display device, a graphical user interface programmed to display the summary video. In some embodiments, the method also includes dynamically adjusting the motion sensitivity threshold value while the summary video is being displayed to a user. In some embodiments, the plurality of summary frames have a number determined based on a user configurable time compression ratio, and the method also includes dynamically adjusting the time compression ratio while the summary video is being displayed to a user.

In accordance with another exemplary embodiment, a non-transitory computer readable medium storing instructions executable by a processing device with a central processing unit (CPU) is disclosed. Execution of the instructions causes the processing device to perform a method for creating a summary video. The method includes generating a background image from a plurality of source video frames. The method also includes comparing the background image to one or more source video frames on a pixel by pixel basis to determine an activity level for pixels within the plurality of source video frames. The method also includes identifying active pixels within each of the plurality of source frames. An active pixel is defined as a pixel having an activity level greater than a motion sensitivity threshold value. The method also includes generating a plurality of summary frames by remapping active pixels from source frames, which are spaced within the source video by a multiple of the number of summary video frames, over spatially corresponding pixels in the background image. The method also includes generating a summary video by combining the plurality of summary frames into a summary video, the summary video having a number of summary frames less than a number of the source video frames.

In some embodiments, generating the background image includes determining, at periodic intervals within a source video, a median value for each pixel over a length of frames. In some embodiments, generating a plurality of summary frames includes remapping pixels such that activity that co-occurs in the source video also co-occurs in the summary video. In some embodiments, the number of frames in the summary video is determined based on a user configurable time compression ratio. In some embodiments, the motion sensitivity threshold value is user configurable. In some embodiments, the method also includes rendering, via an electronic display device, a graphical user interface programmed to display the summary video. In some embodiments, the method also includes dynamically adjusting the motion sensitivity threshold value while the summary video is being displayed to a user. In some embodiments, the plurality of summary frames have a number determined based on a user configurable time compression ratio, and the method also includes dynamically adjusting the time compression ratio while the summary video is being displayed to a user.

In accordance with another exemplary embodiment, a video system for creating a summary video is disclosed. The video system includes a processor with a CPU programmed to generate a background image from a plurality of source video frames. The processor is also programmed to compare the background image to one or more source video frames on a pixel by pixel basis to determine an activity level for pixels within the plurality of source video frames. The processor is also programmed to identify active pixels within each of the plurality of source frames. An active pixel is defined as a pixel having an activity level greater than a motion sensitivity threshold value. The processor is also programmed to generate a plurality of summary frames by remapping active pixels from source frames, which are equally spaced within the source video, over spatially corresponding pixels in the background image. The processor is also programmed to generate a summary video by combining the plurality of summary frames into a summary video, the summary video having a number of summary frames less than a number of the source video frames. The system also includes a storage configured to store the plurality of source frames, the background image, the plurality of source frames, and the summary video. The system also includes a graphical user interface configured to display the summary video to a user.

In some embodiments, the graphical user interface is further configured, in response to a user input command, to dynamically adjust the motion sensitivity threshold value. In some embodiments, the number of summary frames is determined based on a time compression ratio, and the graphical user interface is further configured, in response to a user input command, to dynamically adjust the time compression ratio. In some embodiments, the active pixels are remapped from source frames which are equally spaced within the source video by a multiple of the number of summary video frames.

Any combination or permutation of embodiments is envisioned.

BRIEF DESCRIPTION OF THE DRAWINGS

The foregoing and other features and advantages provided by the present disclosure will be more fully understood from the following description of exemplary embodiments when read together with the accompanying drawings, in which.

DETAILED DESCRIPTION

Figure 1:
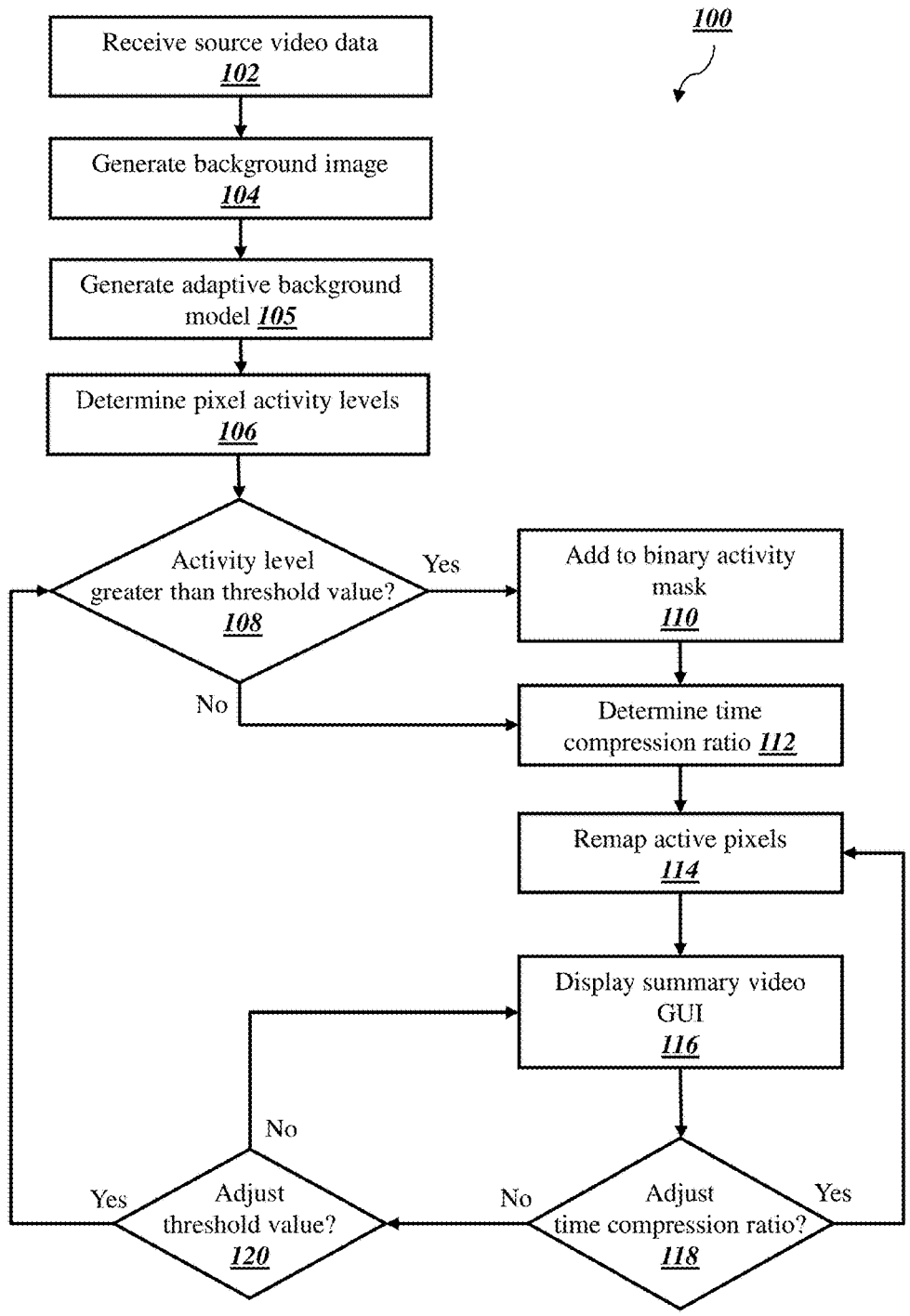
FIG. 1 is a flowchart illustrating an exemplary method for creating a summary video, according to embodiments of the present disclosure.

Provided herein are methodologies, systems, apparatus, and non-transitory computer-readable media for creating and displaying video summaries. Active pixels within a source video are detected and compared against a motion sensitivity threshold value, and pixels higher than the threshold value are remapped over a background image to create a condensed summary video. The active pixels are remapped in a cyclical pattern according to a time compression ratio such that all active pixels within the same frame in the source video will also appear in the same frame in the summary video.

Exemplary embodiments allow an operator to select relevant archived camera feeds or exported video files, specify a time interval over which to review video content, and then view a condensed summary video that depicts all activity from the original video within a shorter timeline. Such video surveillance techniques provide an efficient source of information for infrastructure protection (e.g., bridges, dams, power plants), border surveillance, secure perimeter monitoring, urban law enforcement applications (e.g., in airports, subway stations, or train stations), or any application that requires forensic video review.

In general, video data may be analyzed at a number of different levels, the lowest of which is the pixel level. At the pixel level, individual pixels may be analyzed and compared against a background image to determine whether that pixel is an active pixel (i.e., one where motion is detected) or an inactive pixel (i.e., part of the background). Pixel comparison may be performed on color or grayscale video and image data, in various embodiments. At the object or block level, groups or clusters of pixels are identified as objects within a video frame. These objects may include people, cars, or any object moving through the field of view of a camera. Certain characteristics, such as color and size, may be used to identify objects or pixel blocks. At the track level, an object or block is tracked as it travels in time through various frames of a video. At this level, object characteristics and motion information, such as direction and speed, may be used to track objects in time. The pixel-based video summarization techniques disclosed herein avoid several problems associated with object identification and object tracking. For example, each higher level of processing involves the possibility for added errors. Specifically, conventional track-based video summarization techniques are vulnerable to segmentation errors at the object level and tracking errors at the track level.

Track-based video summary techniques detect and extract objects in the foreground of a video feed (i.e., objects that are distinct from a pre-calculated background image). The objects are then rearranged in time to fit into a more compressed summary video. The resulting summary video can be reviewed by an operator, allowing the operator to scan for particular objects or actions of interest and view a visual depiction of the long-term activity patterns within a scene. Such track-based summary techniques generally involve three main steps. First, the source video is processed to extract activity "tubes," or groupings of pixels across space and time that (ideally) represent individual, separable activities. In practice, this often amounts to tracking physical objects or persons moving through a scene. Second, the activity tubes are rearranged temporally to fit into a more compact summary timeline. Each tube in the original video is assigned a variable position in the summary video timeline. Third, the summary video is created based on the optimally rearranged activity tubes, regardless of whether the activity tubes occurred contemporaneously in the original video.

When object identification is performed at the frame level, there is some risk of partitioning components into smaller sub-regions (over-segmentation) or combining multiple components (under-segmentation). In addition, even carefully constructed object identification and tracking algorithms sometimes fail to maintain a track or will pull in background clutter. This can lead to extracted tubes that contain only fragments of actual foreground activities or multiple neighboring but unassociated activities. After the temporal rearrangement of the activity tubes, summary videos resulting from imperfect segmentation and tracking can contain unappealing visual content. For instance, disjointed playback of activity segments produces an unsettling effect in which objects seem to appear and disappear at random points in time. Furthermore, track-based video summarization techniques shift objects in time independently of their surroundings, and therefore do not necessarily capture interactions among groups of objects. For example, if two components in a source video interact with enough spatial separation to be identified as separate tubes, there is no guarantee that this interaction will be preserved in the summary video. Another consideration for traditional summary approaches is the computation time needed to produce the summary video. The activity tubes can be pre-computed and therefore do not require computation at the time of a summary request. However, the activity tube rearrangement must be performed after the request is made, since it depends upon the parameters of the request including start time, end time, and summary duration. Since the complexity of the tube rearrangement optimization problem grows quadratically with the number of activity tubes, producing the summary video requires non-trivial computation.

Exemplary embodiments address the challenges of track-based activity mapping by performing temporally cyclical pixel-based activity remapping to create a summary video. The pixel-based video summarization techniques disclosed herein do not require object identification or the formation of activity tracks or activity tubes, thus removing at least two sources of error in conventional video summary. This means the pixel-based video summarization techniques taught herein can be applied to a broad set of scene types (e.g., levels of crowdedness, varied object types or sizes, occlusion frequency) without the need to design tracking or association techniques that work in all situations. Furthermore, the pixel-based video summarization techniques disclosed herein provide increased computational efficiency, allowing for dynamic adjustment of the summary video parameters and real-time creation of summary videos, which is not possible in track-based summarization techniques because of the increased computational power required to identify and track objects within the source video and rearrange their positions within the summary video. In exemplary embodiments, pixel-based video summarization techniques also maintain activity co-occurrence, meaning that all active pixels appearing in the same frame in the source video appear in the same frame in the summary video. Thus, significant interactions between objects are preserved. Activity continuity is also preserved, in exemplary embodiments, such that all pairs of foreground pixels appearing in successive frames in the source video appear in successive frames of the summary video, as long as the video is watched on loop. Therefore, object motions or activities that fit within the duration of the summary video are not chopped up into fragments. Instances of long-term activities that exceed the length of the summary can, however, be partitioned into multiple segments that appear simultaneously.

In exemplary embodiments, video summarization begins with an activity detection step. The purpose of this step is to process the source video, represented as a three-dimensional function of space and time $I(\vec{x},t)$, and extract an activity function $A(\vec{x},t)$ indicating the degree of apparent activity within each pixel. Activity levels can be measured using, for example, a pixel-wise adaptive background subtraction model followed by local neighborhood morphological operations like dilation and erosion in order to remove noise and fill in holes. The adaptive background model is a characterization of the background within a certain number of frames before and after each frame of the source video. As such, the adaptive background model is not a static image, but rather an adaptive model of the background that updates over time and can account for ambient changes in light. In addition to this adaptive background model, a background image may be generated, which can be formed by taking the median value of each pixel found in the source video of interest. This background may be denoted as a background image $I_B(\vec{x})$, which forms the backdrop of the summary video, onto which active foreground pixels are copied.

In general, a summary video may be defined by the following parameters: the time interval of the source video sequence spanning $N_0$ frames, the frame length of the summary video $N_1$ which can be determined based on a time compression ratio, and a motion sensitivity threshold value $\omega$. In exemplary embodiments, the summary video can be displayed to a user via a graphical user interface (GUI) that includes parameter controls, which allow a user to dynamically adjust the summary video parameters, including the motion sensitivity and time compression ratio of the summary video. In exemplary embodiments, such controls allow the user to go from sparse visual representations of activity all the way to a dense single-frame representation, which is a static map of all activity in the scene, and anywhere along the spectrum in between. Adjusting the motion sensitivity parameters allows a user to tradeoff between activity detection and clutter suppression, in order to capture the most meaningful content in the summary view. These parameter controls, coupled with the viewing interface, encourage a remarkably effective interactive style of video review and dynamic content exploration.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an exemplary method 100 for creating a summary video, according to embodiments of the present disclosure. The exemplary method 100 is described in reference to the block diagram 600, discussed in more detail below. In step 102, a source video is received. In exemplary embodiments, the source video may be received from a video input device 624, such as one or more surveillance cameras, or from a database or storage that has archived or stored video data. In exemplary embodiments, the source video includes a number of source frames, $N_0$. A background image $I_B$ is generated in step 104. The background image can be generated, for example, using the background pixel detection module 630. As discussed above, the background image $I_B$ may be generated as the set of median pixel values of the $N_0$ frames of the source video of interest. For ease of description, examples are provided herein with RGB pixel values.

Once the background image $I_B$ has been generated, the method may continue with step 105 and generate an adaptive background model. This adaptive background model may be generated using the background pixel detection module 630, and is a characterization of the background over a temporally local span of the source video. In exemplary embodiments, the adaptive background model includes median pixel values from a span or subset of source video frames surrounding a specific source video frame, such that the adaptive background model reflects the evolving light conditions of a scene. Once the adaptive background model is generated, the activity level for pixels within the source video is determined in step 106. This step may be performed, for example, using the active pixel detection module 628. In exemplary embodiments, the source video segment to be reviewed is scanned for detected motion at the pixel level. In one embodiment, each pixel in the source video is assigned a discrete activity score of zero (indicating a static background pixel) or 1 through 255 (indicating degree of apparent motion), using an adaptive background subtraction model. The background subtraction model compares the value of each pixel within a source video frame against the spatially corresponding pixel of an adaptive background model. The activity level of each pixel may be saved, in some embodiments, as an activity map A($\vec{x}$,t) at each frame. The pixel activity level may be stored, for example, in the active pixel storage module 638. In many surveillance scenarios, the nonzero values of this activity map are sparsely distributed because the majority of pixels depict static scene components. Therefore, only the non-zero activity map values are stored. For each pixel where A($\vec{x}$,t)>0, the location value $\vec{x}$, activity level A($\vec{x}$,t), and RGB pixel value I($\vec{x}$,t) are stored. At each frame of the source video, the list of active pixels may be sorted in ascending order by activity score to accommodate efficient retrieval of active pixels exceeding the user-controlled motion sensitivity threshold.

As discussed above, the summary video is generally defined by the following parameters: the time interval of the source video sequence spanning $N_0$ frames, the frame length of the summary video $N_1$, and a motion sensitivity threshold value (represented by "ω" in the equations below). Once the pixel activity level is calculated in step 108, it is computationally determined whether the activity level of each pixel in the source video is greater than the motion sensitivity threshold value. In exemplary embodiments, this may be achieved by retrieving the relevant subset of active pixels (with activity scores exceeding the threshold value ω) for each source frame. In embodiments where the pixel activity level A($\vec{x}$,t) is pre-sorted in ascending order, this amounts to finding the first pixel exceeding the motion sensitivity threshold value and retrieving all subsequent pixels in the array.

If the activity level of a pixel is greater than the motion sensitivity threshold value, then in step 110 the selected pixel is added to a binary activity mask. In exemplary embodiments, the binary activity mask function M($\vec{x}$,t) may be defined according to equation (1) below:

$$M(\vec{x}, t) = \begin{cases} 1 & \text{if } A(\vec{x}, t) \geq \omega \\ 0 & \text{if } A(\vec{x}, t) < \omega \end{cases} \quad (1)$$

This binary activity mask may be saved using an efficient data structure, for example, sparse sets of motion pixels, sorted into lookup tables by frame number and motion score. The data structure is designed to minimize the time required to access active pixels during the synthesis of summary video frames. In exemplary embodiments, the objective of the summary video is to map all pixels with a binary activity mask value of 1 into the summary video. Since this mapping is done at the pixel level and not at the activity tube level, no tracking is required at this stage. Instead, an accumulated activity count function can be generated, C($\vec{x}$,t), with the same time span as the summary video (0≤t<$N_1$), by summing over periodic frames of the mask function according to equation (2) below:

$$C(\vec{x}, t) = \sum_{k=0}^{\lceil \frac{N_0 - t}{N_1} \rceil - 1} M(\vec{x}, kN_1 + t) \quad (2)$$

Once the selected pixel is added to the binary activity mask in step 110, a time compression ratio is determined in step 112, which will determine the final length of the summary video. For example, a compression ratio of two will cut the source video in half resulting in a summary video having a summary video frame number $N_1$ one half the source video frame number $N_0$. Similarly, a compression ratio of eight will result in a summary video one-eighth the duration of the source video. If, however, it is determined in step 108 that the pixel activity level is not above the motion sensitivity threshold value, the time compression ratio is determined in step 112 without adding the pixel to the binary mask in step 110. Once the two parameters of the time compression ratio and the motion sensitivity threshold value are known, generation of the summary video frames may be performed by remapping active pixels over the background image in step 114. In exemplary embodiments, the summary frames and the summary video may be created using the summary frame creation module 646 and the summary video creation module 634.

In exemplary embodiments, a summary sequence $I_S$ is a sequence of individual summary video frames that are each a composite of the background image $I_B$, and the remapped foreground components. The time to compute a single summary frame depends on the length of and amount of activity in the original surveillance video. For example, the creation of a summary video based on a one hour surveillance source video may range from approximately five to fifteen milliseconds, in some embodiments, which is fast enough to support real-time frame generation. In exemplary embodiments, the summary sequence $I_S$ may be generated according to equation (3) below:

$$I_s(\vec{x}, t) = \begin{cases} I_B(\vec{x}) & \text{if } C_s(\vec{x}, t) = 0 \\ I_F(\vec{x}, t) & \text{otherwise} \end{cases} \quad (3)$$

where $I_F$ is computed by collecting any activity at that pixel location across frames that are evenly spaced in the source video timeline, according to equation (4) below:

$$I_F(\vec{x}, t) = \frac{\sum_{k=0}^{\lceil \frac{N_0 - t}{N_1} \rceil - 1} I(\vec{x}, kN_1 + 1) M(\vec{x}, kN_1 + t)}{C(\vec{x}, t)} \quad (4)$$

This is a cyclical mapping procedure where a foreground pixel appearing at location ($\vec{x}$,t) in the source video appears at location ($\vec{x}$,mod(t,$N_1$)) in the summary video, blended with any other foreground pixels mapped to the same location. This pixel-based remapping technique preserves the following important temporal continuity property of the source video: If pixel $p_1$ is at ($\vec{x}_1$,t) and pixel $p_2$ is at ($\vec{x}_2$,t+Δt), with 0≤Δt<$N_1$, then pixel $p_2$ appears Δt frames after $p_1$ in the resulting summary video (assuming that video is played on a loop). Therefore, even though the remapping is performed at the pixel level, rather than the object or track level, foreground objects and local activity sequences remain intact in the summary video.

Once the active pixels are remapped into a summary video, the summary video may be displayed to a user via a GUI at step 116. As discussed above, in exemplary embodiments the GUI allows a user to dynamically adjust the time compression ratio and/or the motion sensitivity threshold value. While the summary video is being displayed via the GUI, the time compression ratio may be adjusted in real time by the user at the GUI in step 118. If the time compression ratio is adjusted in step 118, the method may return to step 114 and remap the active pixels again based on the new time compression ratio and display the new summary video to the user via the GUI in 116.

If the time compression ratio is not adjusted, then in step 120 it is computationally determined whether the motion sensitivity threshold value is being adjusted by the user in real time via the GUI. If the motion sensitivity threshold value is not adjusted, the method continues to display the summary video to the user via the GUI in step 116. If, however, the motion sensitivity threshold value is adjusted, the method may return to step 108 and computationally determine whether the activity levels of each pixel are greater than the new threshold value. The method then continues with the subsequent steps 110-116, displaying the new summary video to the user via the GUI based on the new motion sensitivity threshold value. In some embodiments, the GUI can be generated by GUI 632 of an exemplary computing device 600.

Figure 2:
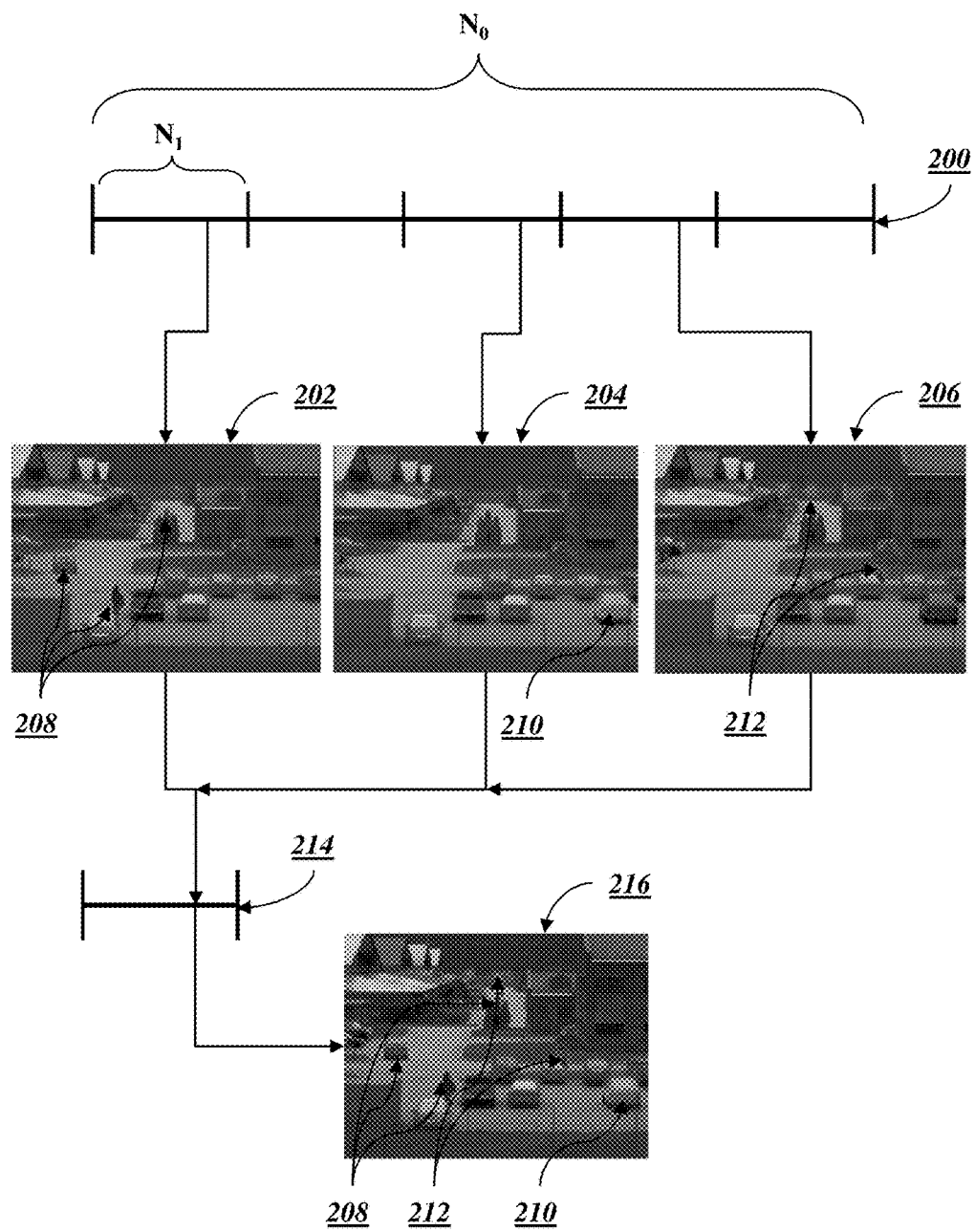
FIG. 2 is a an exemplary video timeline illustrating the formation of a summary video frame in accordance with exemplary embodiments of the present disclosure.

FIG. 2 is a diagram illustrating the formation of a summary video frame 214 in accordance with exemplary embodiments of the present disclosure. In exemplary embodiments, a source video 200, having a number of frames $N_0$, is divided into smaller segments each having a number of frames $N_1$, equal to the number of frames in the summary video. In this embodiment, the source video is sampled at the same time within each of the smaller segments and source video frames 202, 204, and 206 are shown in which activities are detected. Specifically, activities 208 are detected within frame 202, activity 210 is detected within frame 204, and activities 212 are detected within frame 206. As discussed above, the active pixels associated with activities 208, 210, and 212 are combined and remapped over a background image to produce summary frame 216, which includes a composite of all the detected motions or activities 208, 210, and 212. This process is performed for all of the $N_1$ frames of the summary video 214 in order to form the final summary video. Note that, as discussed above, activities which co-occur in the source video sequence 200, such as activities 212, also co-occur in the summary video 214.

Figure 3:
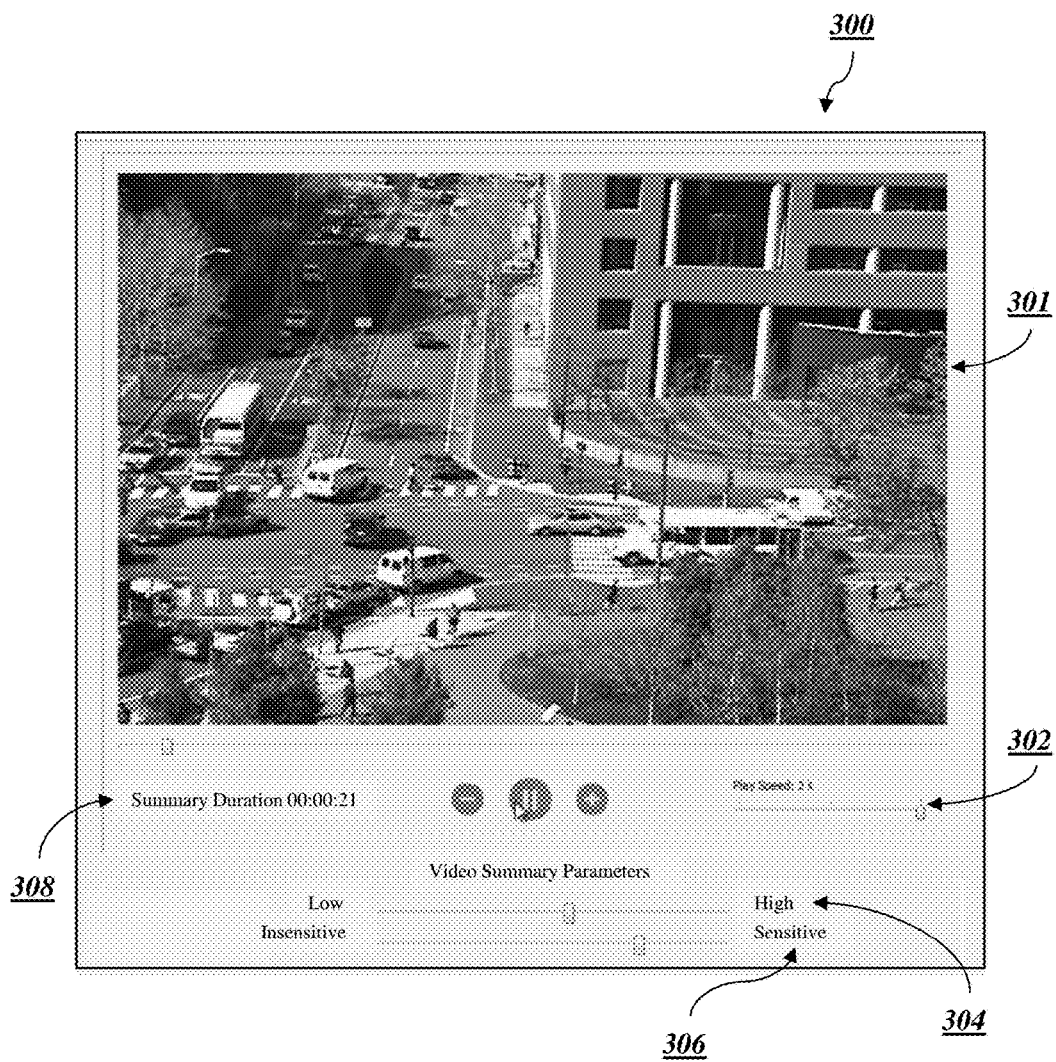
FIG. 3 depicts a screenshot of a graphical user interface for displaying a summary video, in accordance with exemplary embodiments of the present disclosure.

FIG. 3 depicts a screenshot of an example GUI 300 for displaying a summary video, in accordance with exemplary embodiments of the present disclosure. In exemplary embodiments, a GUI displays the summary video to a user and provides the user with instantaneous control over the key parameters of the summary video formation. For example, the GUI may display a first slider bar to control the duration of the summary clip, and therefore the ratio of time compression, and a second slider bar to control the motion sensitivity threshold that determines which pixels are considered to be part of the foreground and mapped into the summary video. In addition, the GUI can allow the viewer to click on a specific pixel in the summary clip and jump to the corresponding frame of the original source video containing that piece of activity. In some embodiments, if the camera or video input device moves, a new background may be computed along with a new summary video for that particular point of view.

The GUI can be generated by GUI 632 of an exemplary computing device 600, as discussed in greater detail below. In exemplary embodiments, the GUI includes a window 301 for displaying a summary video to a user. The GUI also includes a playback speed control bar 302, a time compression control bar 304, a motion sensitivity control bar 306, and a summary video duration indicator 308. The playback speed control bar determines the rate at which new summary frames are displayed from the summary video sequence, which the user may speed up or slow down. In exemplary embodiments, a time compression slider bar or control bar 304 is associated with the time compression ratio (or video summary frame length) and allows the viewer to instantaneously change from a lower compression ratio generating a longer summary video that provides clearer views of individual activity components, to a much higher compression ratio that generates a more condensed summary video showing more dense activity patterns. As the time compression control bar 304 is adjusted, the duration of the summary video, indicated by the summary video duration indicator 308, also changes. The GUI 300 may also include other video control features that allow the user to, for example, zoom in, zoom out, play, pause, rewind, and/or fast-forward a summary video.

In exemplary embodiments, a motion sensitivity control bar 306 allows a user to achieve a desired balance between activity detection and clutter suppression by dynamically adjusting the motion sensitivity threshold value (the $\omega$ parameter). For example, a lower motion sensitivity threshold value results in greater activity or motion detection, but may also result in false activity detection caused by shadows or other minor changes in pixel value that do not represent actual activity in the video frame. In contrast, a higher motion sensitivity threshold value eliminates clutter and many false activity detections, but may miss parts of actual activity within a frame. Using the motion sensitivity control bar 306, the user may adjust the sensitivity between sensitive and insensitive to find the desired balance.

Figure 4A:
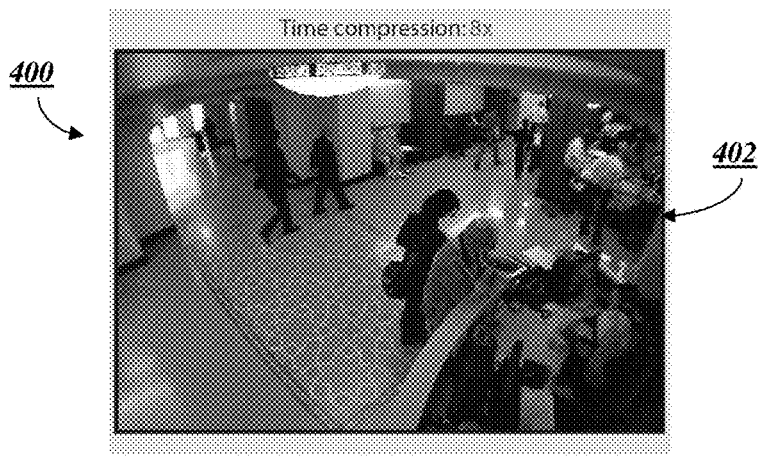
FIGS. 4a-4c depict screenshots of a graphical user interface for displaying a summary video, in accordance with exemplary embodiments of the present disclosure.
Figure 4B:
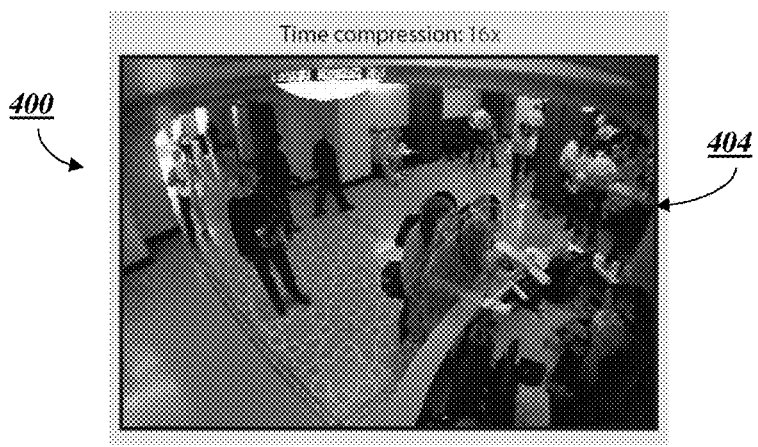
Figure 4C:

FIGS. 4a-4c are screenshots of compressed summary videos that may be displayed via the GUI 400, in accordance with exemplary embodiments of the present disclosure. In exemplary embodiments, once the activity levels of pixels from the source video are pre-computed, a summary video can be generated at a desired compression ratio as needed for viewing.

FIG. 4a is a screenshot of the GUI 400 showing a window 402 displaying a summary video that has compressed the source video to one eighth its original length. In other words a compression ratio of eight-to-one has been applied to the source video to produce the summary frame 402.

Similarly, FIG. 4b is a screenshot of the GUI 400 showing a window 404 displaying a summary video with a sixteen-to-one compression ratio.

FIG. 4c is a screenshot of the GUI 400 showing a window 406 displaying a summary video with a thirty two-to-one compression ratio. As can be seen, a greater activity overlap occurs in summary videos that have a higher compression ratio. In exemplary embodiments, the time compression ratio may be adjusted in real time using a GUI control feature, such as the time compression control bar 304 shown in FIG. 3.

In summary videos having a higher time compression ratio, like the one shown in FIG. 4c, pixel overlap may occur, which can result in lack of clarity in the summary video. In order to avoid visual confusion where there is pixel overlap, an overlapping pixel may be given more weight in the summary video if it has a greater contrast from the background image. Pixel overlap may also be mitigated by the fact that the operator has dynamic control of the time compression ratio, and therefore the observed activity density.

In some embodiments, the active pixels from the source video (having a number of frames $N_0$) can be remapped to the compressed summary video (having a number of frames $N_1$) in blocks of $N_1$ consecutive frames. In an alternative embodiment, in order to leave room to minimize activity overlap, slightly smaller blocks having a length $N_2<N_1$ consecutive frames can be transferred, leaving some margin for translation in the mapping. Each block of frames can then start at any frame from 0 to $N_1-N_2-1$ in the summary timeline. The start frame of the kth block can be denoted by lag variable $L_k$, which represents a degree of freedom in the optimization process. This is equivalent to the method described in the previous section in which $N_2$ is equal to $N_1$ and all $L_k$ are constrained to zero. In order to describe this modified mapping approach, an indicator function δ(k,t) is introduced which equals 1 if block k contributes any foreground pixels to summary frame t, according to the set of lag variables:

$$\delta(k, t) = \begin{cases} 1 & \text{if } L_k \le t < N_2 + L_k \\ 0 & \text{otherwise} \end{cases} \quad (5)$$

Consequently, the counting function of equation (2) may be rewritten according to equation (6) presented below:

$$C(\vec{x}, t) = \sum_{k=0}^{\lceil \frac{N_0-t}{N_1} \rceil - 1} \delta(k, t) \cdot M(\vec{x}, kN_2 - L_k + t) \quad (6)$$

Similarly, the mapped images calculated in equation (4) above may be rewritten according to equation (7) below:

$$I_F(\vec{x}, t) = \frac{\sum_{k=0}^{\lceil \frac{N_0-t}{N_1} \rceil - 1} \delta(k, t) \cdot I_M(\vec{x}, kN_2 - L_k + t)}{C(\vec{x}, t)} \quad (7)$$

Where image $I_M$ is shorthand notation for the product of the image sequence and its activity mask, calculated according to equation (8) below:

$$I_M(\vec{x},t)=I(\vec{x},t) \cdot M(\vec{x},t) \quad (8)$$

The relative time shifts of the mapped activity blocks provide an effective mechanism for reducing overlap. The values of $L_0 \ldots L_K$ may be optimized to minimize the sum of all overlapping foreground pixels in the summary video, using an iterative hill-climbing optimization procedure (for some standard variant, such as simulated annealing, that is less likely to converge on poor local minimum of the cost function). As a result, this alternative embodiment allows for a reduction in activity overlap in the summary video at the cost of additional computation to run the optimization procedure.

Figure 5A:
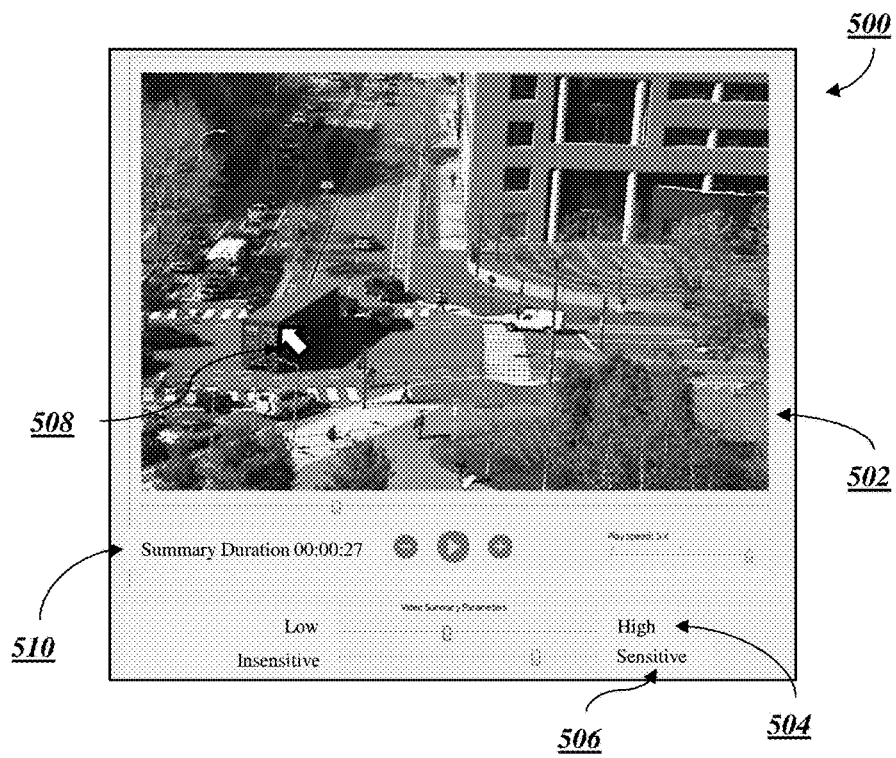
FIG. 5a depicts a screenshot of a graphical user interface for displaying a summary video, in accordance with exemplary embodiments of the present disclosure.
Figure 5B:
FIG. 5b depicts a screenshot of a graphical user interface for displaying a source video, in accordance with exemplary embodiments of the present disclosure.

FIGS. 5a-5b depict screenshots of an example GUI 500 that can be generated in accordance with exemplary embodiments of the present disclosure for accessing a portion of a source video from a summary video. As discussed above, a summary video can be used as a visual index into the original source video, with each active pixel being linked to its corresponding frame in the source video. For example, a user can navigate between a summary video and a source video by selecting an object of interest using, for example, a mouse or other pointing device, and accessing to the relevant portion of the source video that displays the selected object. Thus, a summary video can serve as a navigation tool to more easily find and access activities within a source video.

FIG. 5a shows a window 502 displaying a summary video, along with various GUI controls, as described above in reference to FIG. 3. Specifically, a summary video duration indicator 510 shows the time-length of the summary video shown in window 502, the time compression control bar 504 shows the value of the time compression ratio used for this specific summary video, the motion sensitivity control bar 506 shows the value of the motion sensitivity threshold value used for this specific summary video, and cursor 508 shows the GUI cursor. The summary video shown in window 502 displays a number of activities on a street intersection, and the cursor 508 is hovering over a large semi-truck. By selecting the truck, the user can access the section of the source video where the truck was found. In other words, by selecting the truck in the summary video, the user can access the portion of the source video from which the active pixels of the truck were detected.

FIG. 5b shows the relevant source video in window 512 after the user has selected the truck using the cursor 508. As can be seen, the activity shown in the source video window 512 is less dense than that shown in window 502, and the source video time-stamp indicator 514 displays the time-stamp of the source frame being displayed in window 512. Thus, using the summary video as an index into the source video, a user can select an activity and jump to the corresponding point in time in the source video to examine that activity more closely.

I. Exemplary Computing Devices

Figure 6:
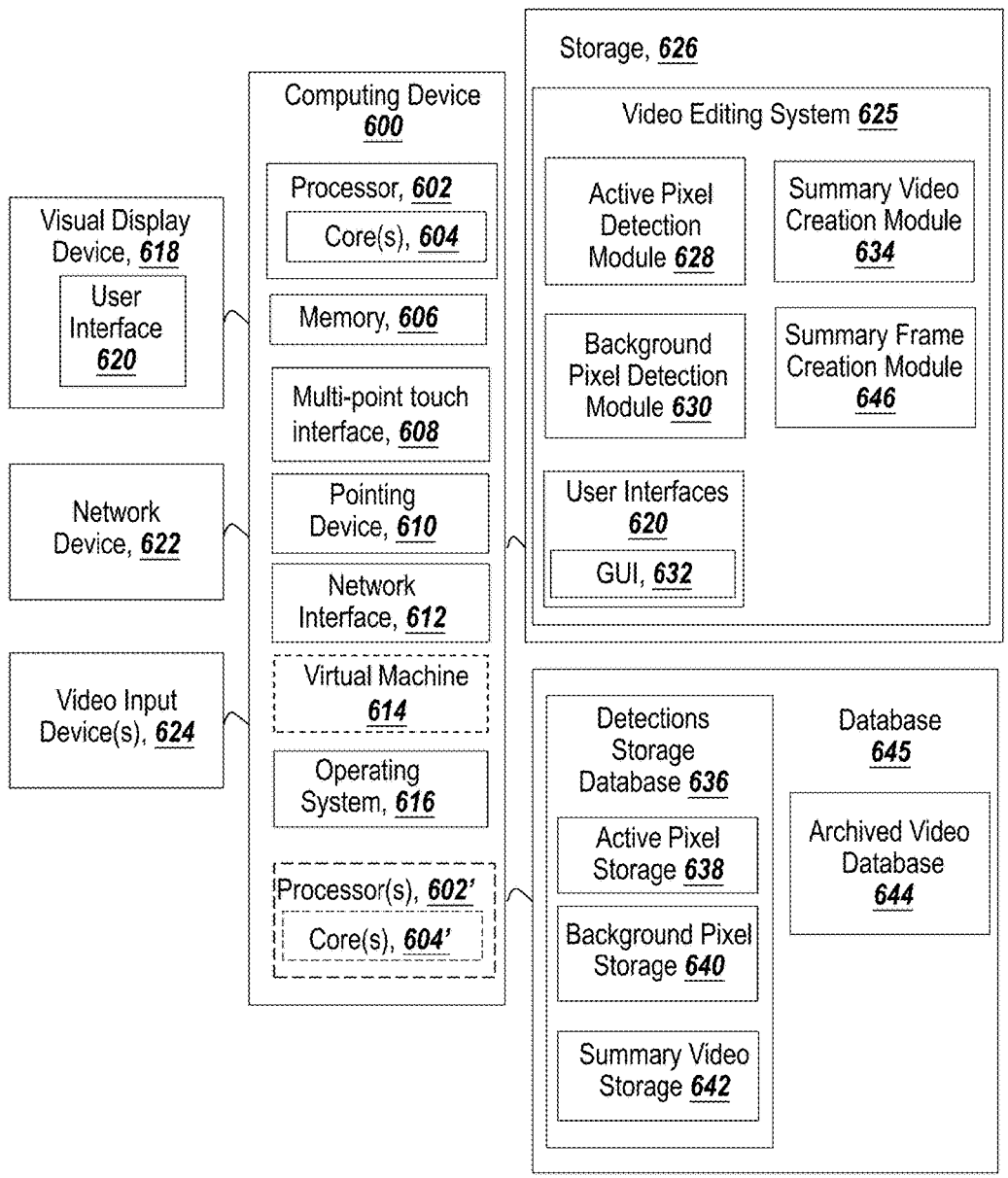
FIG. 6 is a block diagram of an exemplary system that can perform exemplary processes in accordance with exemplary embodiments of the present disclosure.

FIG. 6 is a block diagram of an exemplary computing device 600 that can be used to perform any of the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. Memory 606 can include a computer system memory or random access memory, such as DRAM, SRAM, EDO RAM, and the like. Memory 606 can include other types of memory as well, or combinations thereof. For example, memory 606 included in the computing device 600 can store computer-readable and computer-executable instructions or software for implementing exemplary embodiments taught herein. The computing device 600 also includes processor 602 and associated core 604, and may include one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

A user can interact with the computing device 600 through a visual display device 618, such as a touch screen display or computer monitor, which can display one or more user interfaces 620 that can be provided in accordance with exemplary embodiments, for example, the exemplary interfaces illustrated in FIGS. 3 4*a-c*, and 5*a-5b*. The visual display device 618 can also display other aspects, elements and/or information or data associated with exemplary embodiments, for example, views of databases, maps, tables, graphs, charts, and the like. The computing device 600 can include other I/O devices for receiving input from a user, for example, a keyboard or any suitable multi-point touch interface 608, and/or a pointing device 610 (e.g., a pen, stylus, mouse, or trackpad). The keyboard and/or the pointing device 610 can be electrically coupled to the visual display device 618. The computing device 600 can include other suitable I/O peripherals.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances. The computing device 600 may include one or more video input devices 624, such as one or more video cameras that may be used by a user to provide one or more video input streams.

The computing device 600 can also include one or more storage devices 626, such as a hard-drive, CD-ROM, or other computer readable media, for storing data and computer-readable instructions and/or software that implement exemplary embodiments as taught herein or portions thereof. Storage 626 includes a video editing system 625. Video editing system 625 includes an active pixel detection module 628, background pixel detection module 630, user interfaces 620, summary video creation module 634, and/or the summary frame creation module 646, in exemplary embodiments. The user interfaces 620 can include a GUI 632 that can be rendered by the visual display device 618.

In exemplary embodiments, the active pixel detection module 628 can detect active pixels within each source frame by comparing each pixel value with the corresponding pixel within the background image. As discussed above, a motion sensitivity threshold value may be used to determine which pixels are active versus which pixels are merely part of the background image. The pixels of the background image, as well as the adaptive background model that characterizes the background over a temporally local span of source video, can be generated using the background pixel detection module 630.

In exemplary embodiments, the summary frame creation module 646 creates the frames of a summary video by overlaying the active pixels over the background image; and the summary video creation module 634 creates the summary video by aggregating the summary frames in the proper order to create a summary video. As discussed above, the number of frames included in a summary video can be determined based on a compression ratio, which can be dynamically adjusted by a user via the GUI 632, in some embodiments. These modules may be logically or physically separate, or combined into one or more modules.

An exemplary database 645 can store one or more additional databases, such as the detections storage database 636 or the archived video database 644, for storing any suitable information required to implement exemplary embodiments. The archived video database 644 may store, for example, the original source video and/or video data relating to previously created summary videos. In exemplary embodiments, the detections storage database 636 may include an active pixel storage 638 for storing information regarding active pixels within the source video, a background pixel storage 640 for storing information regarding the pixels that make up the background image, and/or a summary video storage 642 for storing the summary video once it is created. The database 645 may be provided on the computing device 600 or provided separately or remotely from the computing device 600.

II. Exemplary Network Environments

Figure 7:
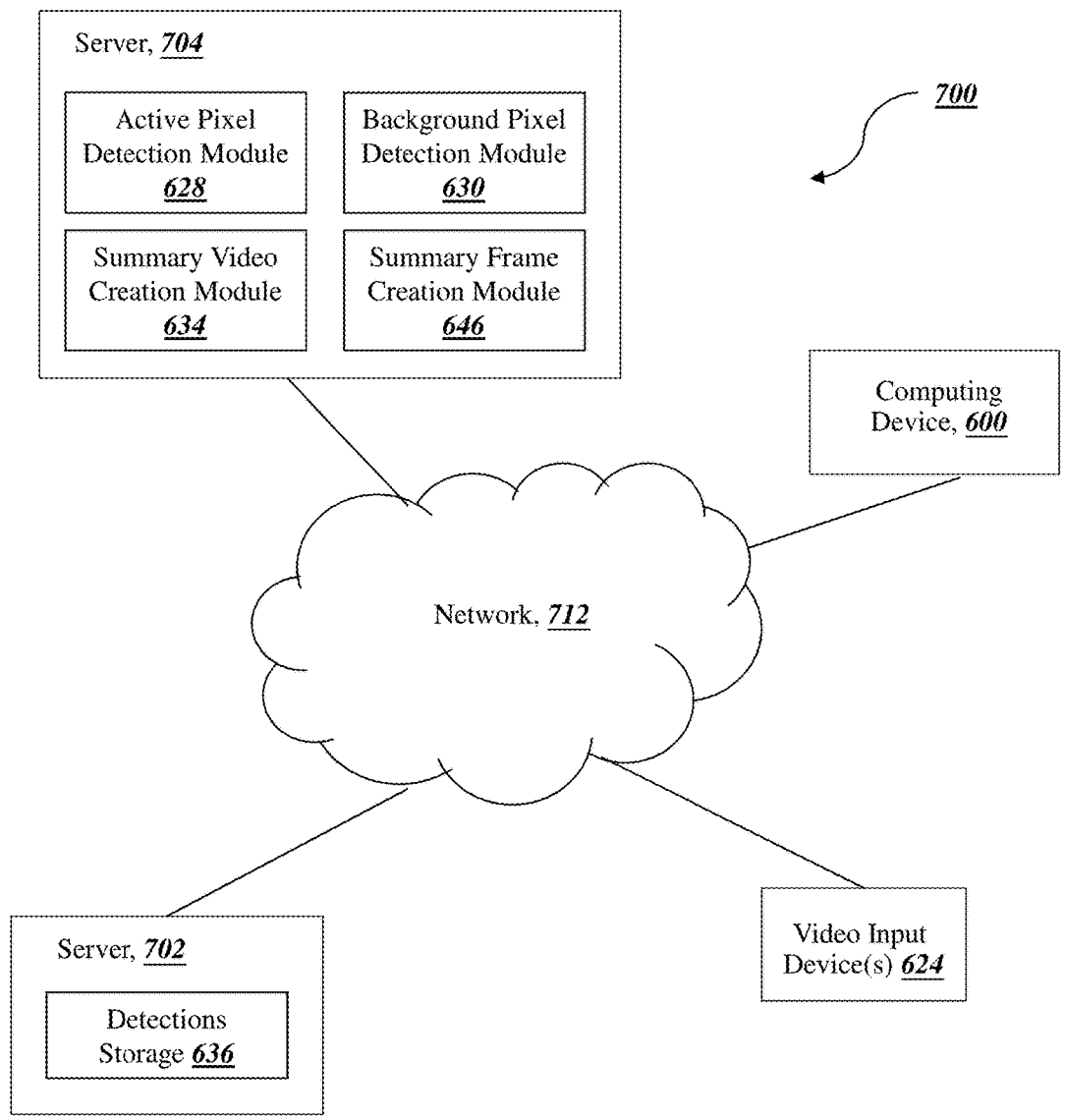
FIG. 7 is a diagram of an exemplary network environment suitable for a distributed implementation of exemplary embodiments of the present disclosure.

FIG. 7 is a diagram of an exemplary network environment 700 suitable for a distributed implementation of exemplary embodiments. The network environment 700 can include one or more servers 702 and 704 that can include the active pixel detection module 628, the background pixel detection module 630, the summary frame creation module 646, the summary video creation module 634, the detections storage 636, or other elements described in reference to FIG. 6 above. In exemplary embodiments, the server 704 can include the active pixel detection module 628, the background pixel detection module 630, the summary frame creation module 646, and the summary video creation module 634; while the server 702 includes the detections storage 636. As will be appreciated, various distributed or centralized configurations may be implemented, and in some embodiments a single server can be used. The network environment can also include computing device 600 and video input device(s) 624, and/or other elements described in reference to FIG. 6.

In exemplary embodiments, the servers 702 and 704, computing device 600, and video input device(s) 624 may be in communication with each other via a communication network 712. The communication network 712 may include, but is not limited to, the Internet, an intranet, a LAN (Local Area Network), a WAN (Wide Area Network), a MAN (Metropolitan Area Network), a wireless network, an optical network, and the like. In exemplary embodiments, in response to user input commands at the computing device 600, a user can dynamically configure the summary video parameters, such as the motion sensitivity threshold value and/or the summary video compression ratio. Once a summary video is created at the summary video creation module 634, the summary video may be transmitted to the computing device 600 and displayed to a user via a GUI.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A video editing method for creating a summary video, the method comprising:
    generating a background image from a plurality of source video frames;
    generating an adaptive background model from a subset of the plurality of source video frames;
    comparing the adaptive background model to one or more source video frames on a pixel by pixel basis to determine an activity level for pixels within the plurality of source video frames;
    identifying active pixels within two or more of the plurality of source video frames, wherein an active pixel comprises a pixel having an activity level greater than a motion sensitivity threshold value;
    generating a summary video frame by remapping the active pixels from two or more of the plurality of source video frames over spatially corresponding pixels in the background image to form a composite image that includes the active pixels and portions of the background image,
    wherein the remapping of the active pixels is a cyclical mapping process where an active pixel that appears at spatial location (x,y) and time t in at least one of the source video frames appears at location (x,y) and time $mod(t,N_1)$) in the summary video frames, blended with any other active pixels mapped to a same location, where $N_1$ is a number of summary video frames; and
    generating a summary video by combining the plurality of the summary video frames into a summary video, the summary video having a number of the summary video frames less than a number of the source video frames.

2. The method of claim 1, wherein generating the background image comprises determining a median value for each pixel over a length of frames.

3. The method of claim 1, wherein generating the summary video frames comprises remapping pixels such that activity that co-occurs in the source video also co-occurs in the summary video.

4. The method of claim 1, wherein the summary video frames have a number determined based on a user configurable time compression ratio.

5. The method of claim 1, wherein the motion sensitivity threshold value is user configurable.

6. The method of claim 1, further comprising rendering, via an electronic display device, a graphical user interface programmed to display the summary video.

7. The method of claim 6, wherein the summary video frames have a number determined based on a user configurable time compression ratio, and further comprising dynamically adjusting at least one of the time compression ratio or the motion sensitivity threshold value while the summary video is being displayed to a user.

8. The method of claim 1, wherein generating a summary video comprises combining the summary video frames such that active pixels from consecutive frames of the source video are remapped to consecutive frames in the summary video.

9. A non-transitory computer readable medium storing instructions executable by a processing device, wherein execution of the instructions causes the processing device to implement a method for creating a summary video comprising:
    generating a background image from a plurality of source video frames;
    generating an adaptive background model from a subset of the plurality of source video frames;
    comparing the adaptive background model to one or more source video frames on a pixel by pixel basis to determine an activity level for pixels within the plurality of source video frames;
    identifying active pixels within two or more of the plurality of source video frames, wherein an active pixel comprises a pixel having an activity level greater than a motion sensitivity threshold value;
    generating a summary video frame by remapping the active pixels from two or more of the plurality of source video frames over spatially corresponding pixels in the background image to form a composite image that includes the active pixels and portions of the background image,
    wherein the remapping of the active pixels is a cyclical mapping process where an active pixel that appears at spatial location (x,y) and time t in at least one of the source video frames appears at location (x,y) and time $mod(t,N_1)$) in the summary video frames, blended with any other active pixels mapped to a same location, where $N_1$ is a number of summary video frames; and
    generating a summary video by combining a plurality of the summary video frames into a summary video, the summary video having a number of the summary video frames less than a number of the source video frames.

10. The non-transitory computer readable medium of claim 9, wherein generating the background image comprises determining a median value for each pixel over a length of frames.

11. The non-transitory computer readable medium of claim 9, wherein generating the summary video frames comprises remapping pixels such that activity that co-occurs in the source video also co-occurs in the summary video.

12. The non-transitory computer readable medium of claim 9, wherein the summary video frames have a number determined based on a user configurable time compression ratio.

13. The non-transitory computer readable medium of claim 9, wherein the motion sensitivity threshold value is user configurable.

14. The non-transitory computer readable medium of claim 9, further comprising rendering, via an electronic display device, a graphical user interface programmed to display the summary video.

15. The non-transitory computer readable medium of claim 14, wherein the summary video frames have a number determined based on a user configurable time compression ratio, and further comprising dynamically adjusting at least one of the time compression ratio or the motion sensitivity threshold value while the summary video is being displayed to a user.

16. The non-transitory computer readable medium of claim 9, wherein generating a summary video comprises combining the summary video frames such that active pixels from consecutive frames of the source video are remapped to consecutive frames in the summary video.

17. A system for creating a summary video, the system comprising:
  a processor programmed to:
    generate a background image from a plurality of source video frames;
    generate an adaptive background model from a subset of the plurality of source video frames;
    compare the adaptive background model to one or more source video frames on a pixel by pixel basis to determine an activity level for pixels within the plurality of source video frames;
    identify active pixels within two or more of the plurality of source video frames, wherein an active pixel comprises a pixel having an activity level greater than a motion sensitivity threshold value;
    generate a summary video frame by remapping active pixels from two or more of the plurality of source video frames over spatially corresponding pixels in the background image to form a composite image that includes the active pixels and portions of the background image,
    wherein the remapping of the active pixels is a cyclical mapping process where an active pixel that appears at spatial location (x,y) and time t in at least one of the source video frames appears at location (x,y) and time $mod(t, N_1)$) in the summary video frames, blended with any other active pixels mapped to a same location, where $N_1$ is a number of summary video frames; and
    generate a summary video by combining a plurality of the summary video frames into a summary video, the summary video having a number of the summary video frames less than a number of the source video frames;
  a storage configured to store the plurality of source video frames, the background image, the plurality of source video frames, and the summary video; and
  a graphical user interface configured to display the summary video to a user.

18. The system of claim 17, wherein, in response to a user input command, the graphical user interface is further configured to dynamically adjust the motion sensitivity threshold value.

19. The system of claim 17, wherein the number of the summary video frames is determined based on a time compression ratio, and the graphical user interface is further configured, in response to a user input command, to dynamically adjust the time compression ratio.

20. The system of claim 17, wherein the active pixels are remapped from source video frames which are equally spaced within the source video by a multiple of the number of the summary video frames.

* * * * *